United States Patent
Lin et al.

(10) Patent No.: US 7,318,570 B2
(45) Date of Patent: Jan. 15, 2008

(54) ADJUSTMENT MECHANISM AND ELECTRONIC DEVICE UTILIZING THE SAME

(75) Inventors: Chi-Cheng Lin, Taoyuan County (TW); Kuen-Yao Lee, Taoyuan (TW)

(73) Assignee: Benq Corporation, Taoyuan (TW)

( * ) Notice: Subject to any disclaimer, the term of this patent is extended or adjusted under 35 U.S.C. 154(b) by 53 days.

(21) Appl. No.: 11/272,758

(22) Filed: Nov. 15, 2005

(65) Prior Publication Data
US 2006/0169853 A1 Aug. 3, 2006

(30) Foreign Application Priority Data
Nov. 16, 2004 (TW) .............................. 93135073 A

(51) Int. Cl.
*F16M 11/24* (2006.01)
(52) U.S. Cl. .................... 248/188.2; 248/677; 353/119
(58) Field of Classification Search ............. 248/188.2, 248/188.3, 188.4, 188.8, 649, 650, 677; 353/119, 353/70; 312/10.1; 352/232
See application file for complete search history.

(56) References Cited

U.S. PATENT DOCUMENTS

| | | | | |
|---|---|---|---|---|
| 1,417,639 A | * | 5/1922 | Sterner | 248/188.4 |
| 2,683,576 A | * | 7/1954 | Miller | 248/562 |
| 4,212,255 A | * | 7/1980 | Wolf | 112/217.1 |
| 6,302,543 B1 | * | 10/2001 | Arai et al. | 353/70 |
| 6,715,890 B2 | * | 4/2004 | Huang et al. | 353/119 |
| 6,729,590 B2 | * | 5/2004 | Gabriel | 248/188.2 |
| 6,796,538 B2 | * | 9/2004 | Hsu et al. | 248/188.2 |
| 7,111,948 B2 | * | 9/2006 | Lee et al. | 353/119 |
| 2006/0006295 A1 | * | 1/2006 | Gainer | 248/188.4 |

* cited by examiner

*Primary Examiner*—Ramon O Ramirez
(74) *Attorney, Agent, or Firm*—Birch, Stewart, Kolasch & Birch, LLP

(57) ABSTRACT

An electronic device and an adjustment mechanism thereof. The electronic device includes a housing, an adjusting member, a lifting assembly, and a driving assembly. The adjusting member is moveably connected to the housing. The lifting assembly connects the adjusting member and the housing to move the adjusting member with respect to the housing. The driving assembly connects the lifting assembly and the housing to drive the lifting assembly to move the adjusting member. Thus, the housing is adjusted.

10 Claims, 6 Drawing Sheets

US 7,318,570 B2

ADJUSTMENT MECHANISM AND ELECTRONIC DEVICE UTILIZING THE SAME

BACKGROUND

The invention relates to electronic devices, and in particular, to electronic devices with adjustment mechanisms for quickly adjusting bodies thereof.

When a conventional projector is placed on a desk to be operated, its body needs to be adjusted. To obtain accurate projection, desk levelness, desk smoothness, projecting direction and projecting size need to be considered during adjustment.

The adjustment of the conventional projector is often operated separately by several adjustable feet. FIG. 1 depicts a conventional electronic device 10 in need of adjustment. The electronic device 10 comprises a plurality of adjustable feet 12. Note that only one adjustable foot 12 is shown in FIG. 1. A pad 13 is disposed on the adjustable foot 12, which is fixed to a housing 11 via a nut 14. The adjustment foot 12 may be moved upward/downward in a direction shown by arrow B1 by rotating the adjustable foot 12 in a direction shown by arrow A1. Since the above adjustment is performed by manual rotation, its speed is extremely slow.

FIG. 2 depicts another conventional electronic device 20 in need of adjustment. The electronic device 20 comprises a plurality of adjustable feet 22. Note that only one adjustable foot 22 is shown in FIG. 2. A pad 23 is disposed on the adjustable foot 22, which is positioned in a housing 21 via an elastic member 24. The adjustable foot 22 can be roughly adjusted by releasing the elastic member 24, and slightly adjusted to be moved up and down in a direction (shown by arrow B2) by self-rotating in a direction (shown by arrow A2).

Although the elastic member 24 in FIG. 2 shortens adjustment time, the operation is still inconvenient since moving the elastic member 24 and pulling the adjustable foot 22 occur at the same time. Additionally, different adjustable feet may need to be adjusted respectively, thus increasing adjustment time.

Specifically, each adjustable foot in the conventional adjustment mechanism requires manual adjustment. Moreover, one adjustable foot may be adjusted by both hands. Thus, the adjustment time cannot be significantly shortened, nor can the position of the body be accurately adjusted, due to inconvenience of the adjustment operation.

SUMMARY

Electronic devices are provided. An exemplary embodiment of an electronic device comprises a housing, an adjusting member, a first elastic member, a gear, a second elastic member, and a transmission unit. The adjusting member comprises a plurality of teeth, and is connected to the object in a moveable manner. The first elastic member abuts the adjusting member and the housing respectively to move the adjusting member with respect to the housing. The gear meshes with the teeth of the adjusting member for positioning the adjusting member. The second elastic member is connected to the housing and separably connected to the gear for positioning the gear. The transmission unit is separably connected to the second elastic member to separate the second elastic member from the gear. When the second elastic member is separated from the gear by the transmission unit, the adjusting member is moved with respect to the housing by the first elastic member. Thus, the position of the housing is adjusted.

Note that the second elastic member may be a tension spring, and the electronic device may be a projector.

Furthermore, the electronic device comprises a shaft, an intermediate wheel, a damper, and a brake plate. The shaft is connected to the housing. The gear is disposed on the shaft. The intermediate wheel is disposed on the shaft to connect to the second elastic member. The damper is disposed on the shaft to restrain the speed of the adjusting member. The brake plate is disposed on the second elastic member, such that the second elastic member is connected to the gear via the brake plate.

Moreover, the transmission unit comprises a release member and a rod. The release member separably abuts the elastic member to separate the elastic member from the gear. The rod is connected to the release member.

Additionally, the electronic device further comprises a button disposed on the housing and connected to the transmission unit so that the transmission unit is connected to the second elastic member. Alternatively, the electronic device further comprises a solenoid, a switch, and a delay circuit. The solenoid is connected to the transmission unit so that the transmission unit is connected to the second elastic member. The switch is disposed on the housing and electrically connected to the solenoid to actuate the solenoid. The switch may be a tactile switch. The delay circuit is electrically connected to the switch and the solenoid so that the transmission unit is connected to the second elastic member within a predetermined time after the solenoid is actuated by the switch.

Adjustment mechanisms are provided. An exemplary embodiment of an adjustment mechanism is connected to an object to adjust the height of the object, and comprises an adjusting member, a lifting assembly, and a driving assembly. The adjusting member is moveably connected to the object. The lifting assembly is connected to the adjusting member to move the adjusting member. The driving assembly is connected to the lifting assembly to drive the lifting assembly to move the adjusting member. Thus, the height of the object is adjusted.

DESCRIPTION OF THE DRAWINGS

The invention can be more fully understood by reading the subsequent detailed description and examples with references made to the accompanying drawings, wherein.

DETAILED DESCRIPTION

Figure 1:
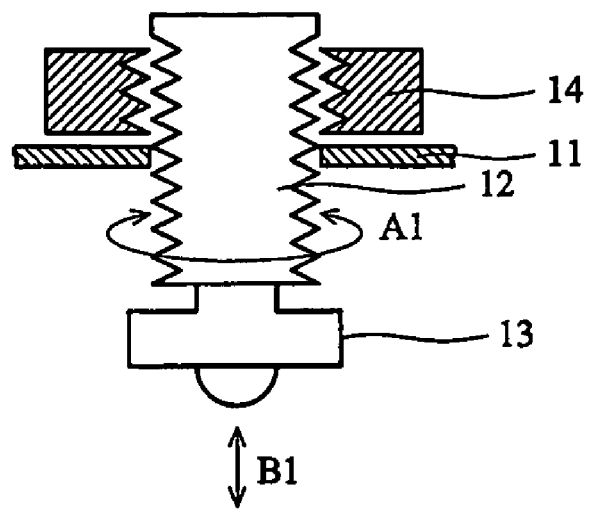
FIG. 1 is a schematic view of a conventional adjustment mechanism.
Figure 2:
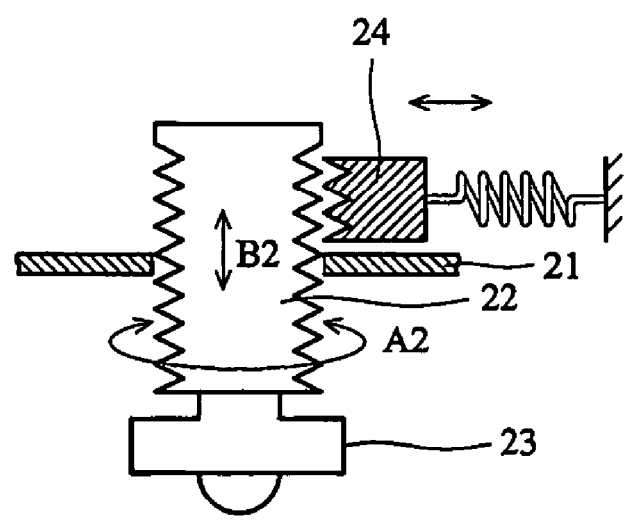
FIG. 2 is a schematic view of another conventional adjustment mechanism.
Figure 3:
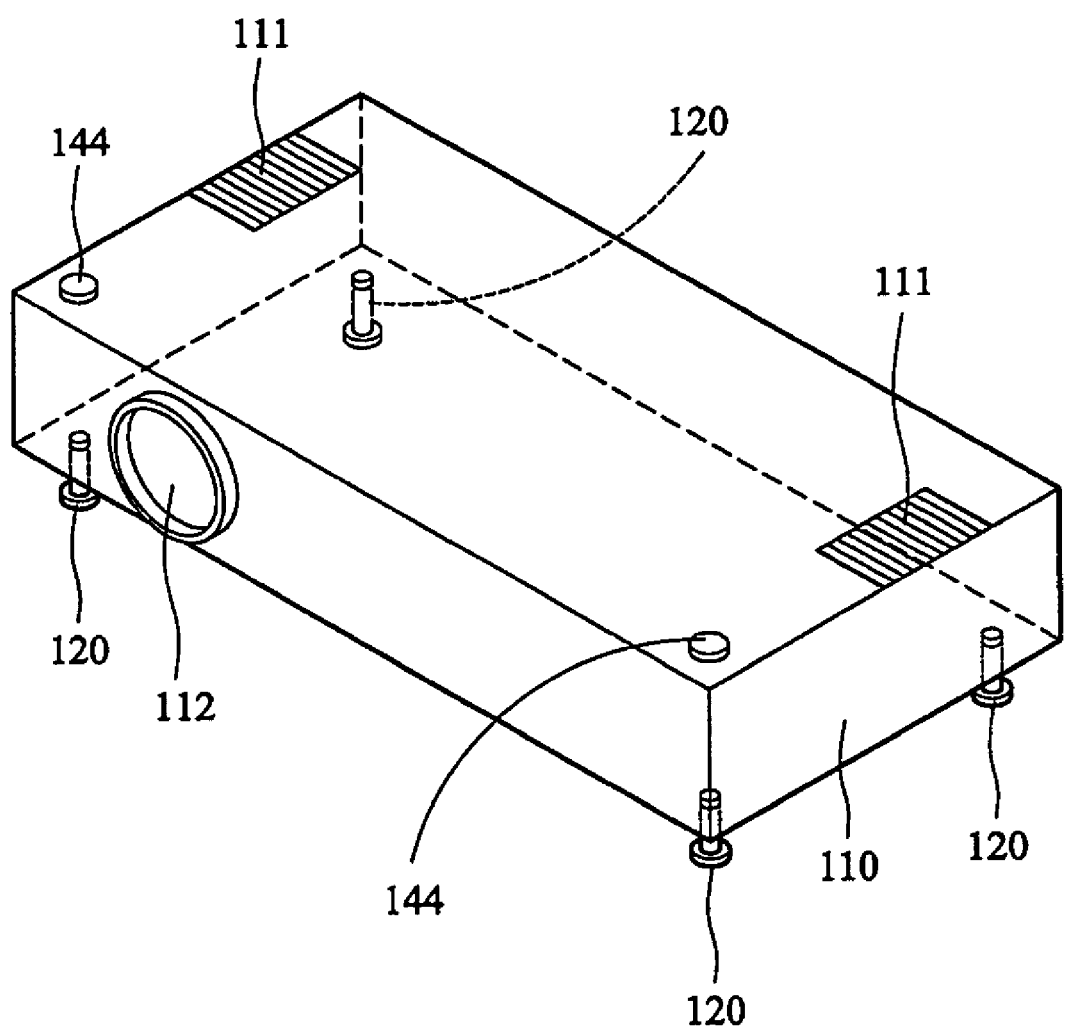
FIG. 3 is a schematic view of an embodiment of an electronic device.
Figure 4:
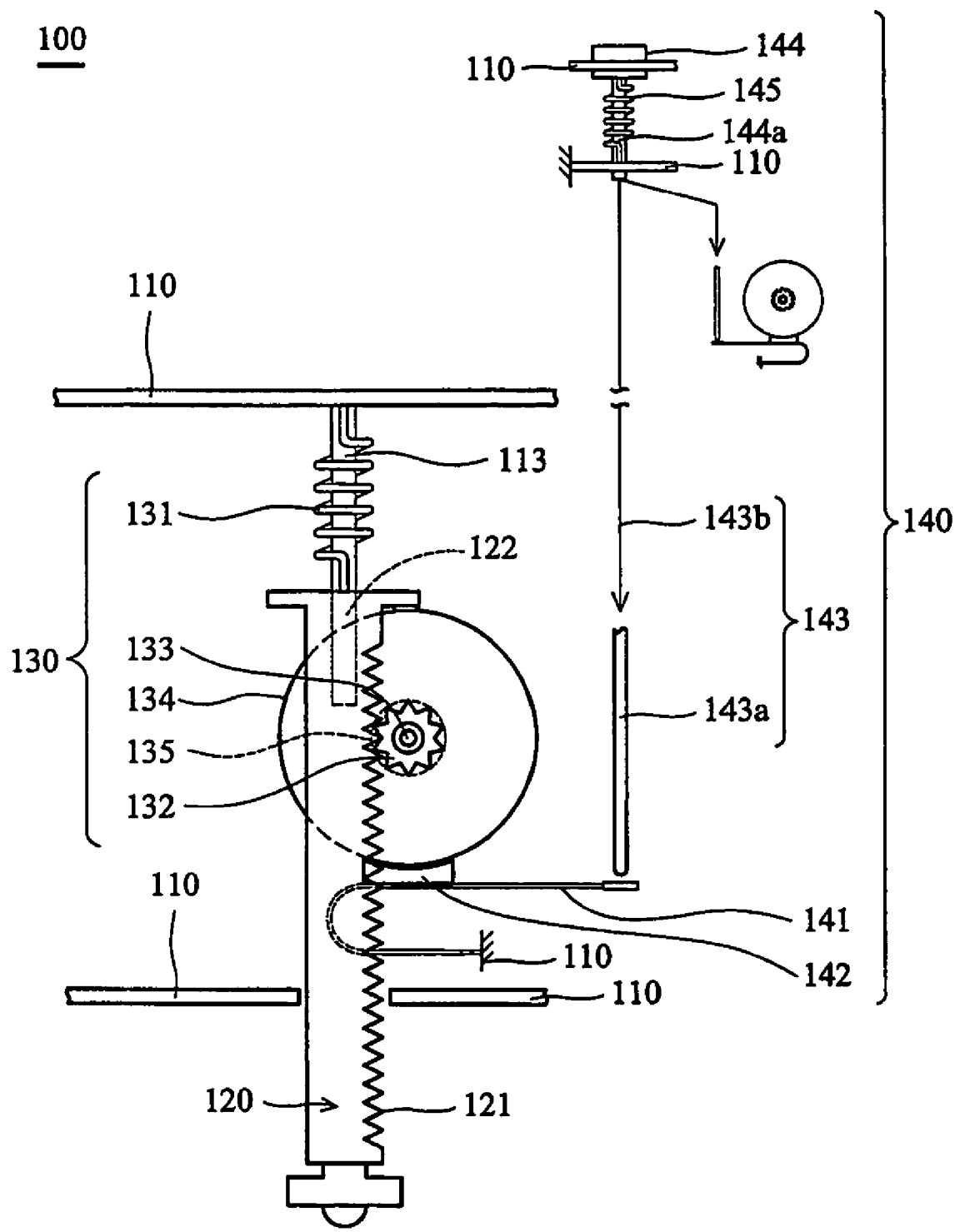
FIG. 4 is a schematic view of an adjustment mechanism in FIG. 3.

FIGS. 3 and 4 depict an embodiment of an electronic device 100 comprising a housing 110, four adjusting members 120, four lifting assemblies 130, and two driving assemblies 140. The adjusting members 120, the lifting assemblies 130, and the driving assemblies 140 constitute an embodiment of an adjustment mechanism.

The housing 110 comprises two pads 111 on its upper surface, and a projection lens 112 at its front surface. While an embodiment of the electronic device is described based on a projector, it is not limited thereto, and may be applied to other electronic devices with a body required to be adjusted.

Each adjusting member 120 is connected to the housing 110 via a first elastic member 131 of the lifting assembly 130 so as to be moveable with respect to the housing 110. Each adjusting member 120 comprises a plurality of teeth 121 at its side surface. Note that each adjusting member 120 further comprises a hollow portion 122 at its upper portion, as shown in FIG. 4. Thus, when the adjusting member 120 moves upward/downward, a rod 113 of the housing 110 enters the hollow portion 122 of the adjusting member 120.

Each lifting assembly 130 is disposed on the housing 110, and comprises the first elastic member 131, a gear 132, a shaft 133, an intermediate wheel 134, and a damper 135. The first elastic member 131 surrounds the rod 113 to abut the adjusting member 120 and housing 110. The first elastic member 131 may be a tension spring to move the adjusting member 120.

Figure 5:
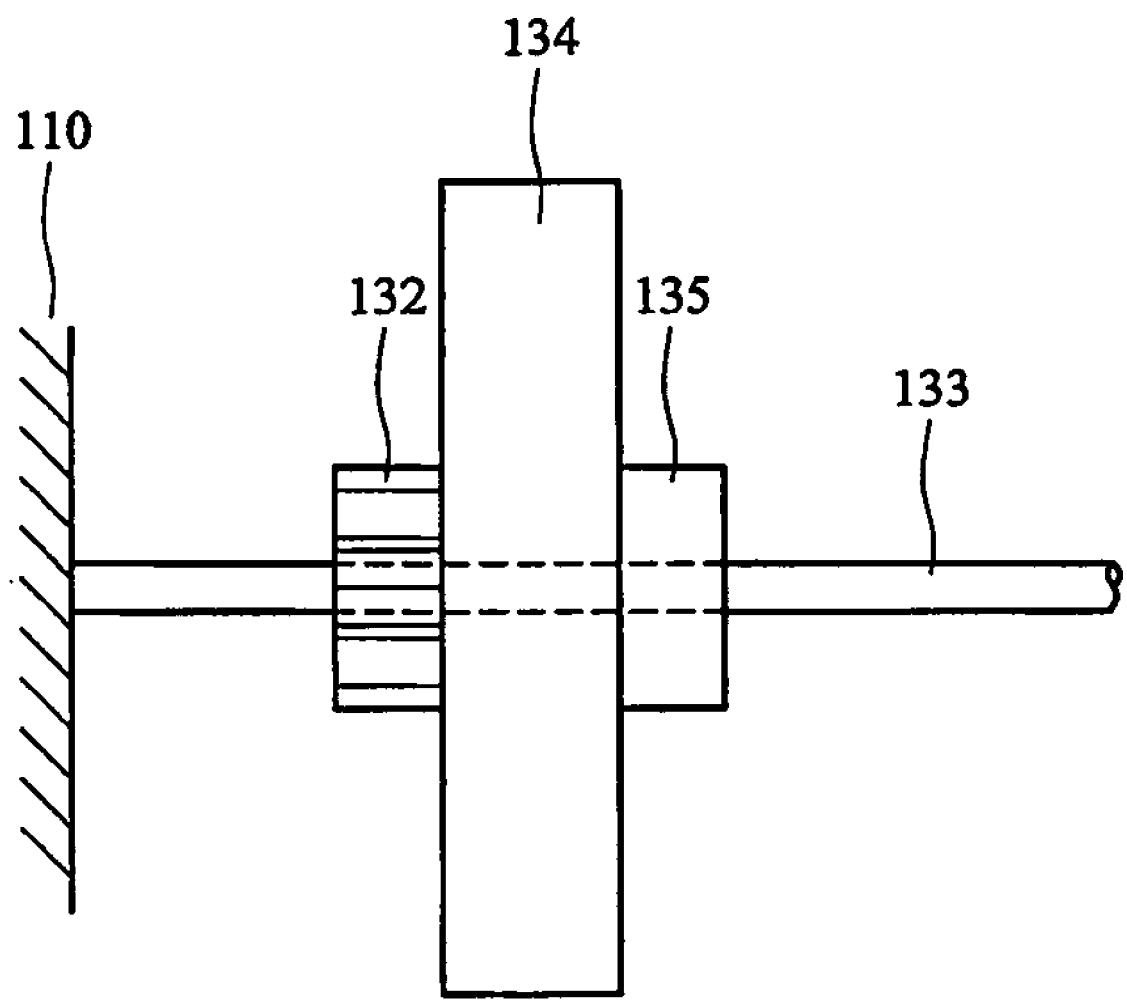
FIG. 5 is a side view of a gear, an intermediate wheel, and a damper in FIG. 4.

As shown in FIG. 5, the shaft 133 is fixed to the housing 110. The gear 132, the intermediate wheel 134, and the damper 135 are disposed on the shaft 133. The gear 132 meshes with the teeth 121 of the adjusting member 120 to position the adjusting member 120 in a predetermined position. The intermediate wheel 134 abuts a brake plate 142 of the driving assembly 140 so that the adjusting member 120 may be moved upward/downward in a stepless manner. Moreover, the intermediate wheel 134 may reduce external pressure applied on the brake plate 142 via the gear 132 so that the adjustment can be quickly and accurately performed. The damper 135 restrains the speed of the adjusting member 120 so that the adjusting member 120 may be smoothly adjusted.

Note that the intermediate wheel 134 and the damper 135 may be omitted based on requirements. When omitting the intermediate wheel 134, the brake plate 142 of the driving assembly 130 abuts the gear 132.

Each driving assembly 140 is connected to the housing 110, and comprises two second elastic members 141, two brake plates 142, two transmission units 143, a button 144, and a third elastic member 145. That is, each driving assembly 140 is connected to two lifting assemblies 130. Note that only one lifting assembly 130 and one driving assembly 140 are specifically shown in FIG. 4 for simplicity.

One end of the second elastic member 141 is connected to the housing 110, and partially abuts the intermediate wheel 134 via the brake plate 142 in a separable manner to fix the intermediate wheel 134 in a predetermined position.

The transmission unit 143 comprises a release member 143a and a rod 143b. The release member 143a separably abuts the second elastic member 141. When the release member 143a is pressed downward to abut the second elastic member 141, the brake plate 142 on the second elastic member 141 is separated from the intermediate wheel 134. The rod 143b is connected to the release member 143a and the button 144 respectively. When the button 144 is pressed, the release member 143a is pressed downward by the rod 143b. Note that the rod 143b is represented by an arrow in FIG. 4, and is aligned with the release member 143a for simplicity. In practice, the rod 143b may be, for example, perpendicular to the release member 143a.

The button 144 is disposed on the housing 110, and comprises a connecting portion 144a connected to the rod 143b. When the button 144 is pressed, the rod 143b is pressed downward so that the release member 143a abuts the second elastic member 141. The third elastic member 145 is disposed around the connecting portion 144a, and abuts the housing 110 and a bottom of the button 144 respectively to return the button 144 to a predetermined position.

To adjust the position of the body of the electronic device 100, because the elastic spring force of the first elastic member 131 is much higher than the elastic spring force of the third elastic member 145, the housing 110 is first slightly lifted while the buttons 144 are pushed.

Thus, the rods 143b actuate the release members 143a to move the second elastic members 141 and the brake plates 142. Once the brake plates 142 are released, the intermediate wheels 134 on the shafts 133 move freely so that the gears 132 on the shafts 133 and the adjusting members 120 are also released. As a result, the adjusting members 120 are ejected outward from the housing 110 to a maximum length by the first elastic member 131. Then, the housing 110 is slightly depressed while the buttons 144 are still pushed. After the body reaches a desired position, the buttons 144 are released so that the position of the body is fixed.

With the adjustment mechanism of the embodiment, the body may be adjusted without touching the adjusting members. Also, since the adjustment is stepless, the position of the body may be smoothly adjusted. Furthermore, the adjustment is performed by pushing the buttons, thus enhancing convenience. Moreover, the adjusting members may be quickly returned to within the housing by pushing the buttons while pressing the housing.

Figure 6:
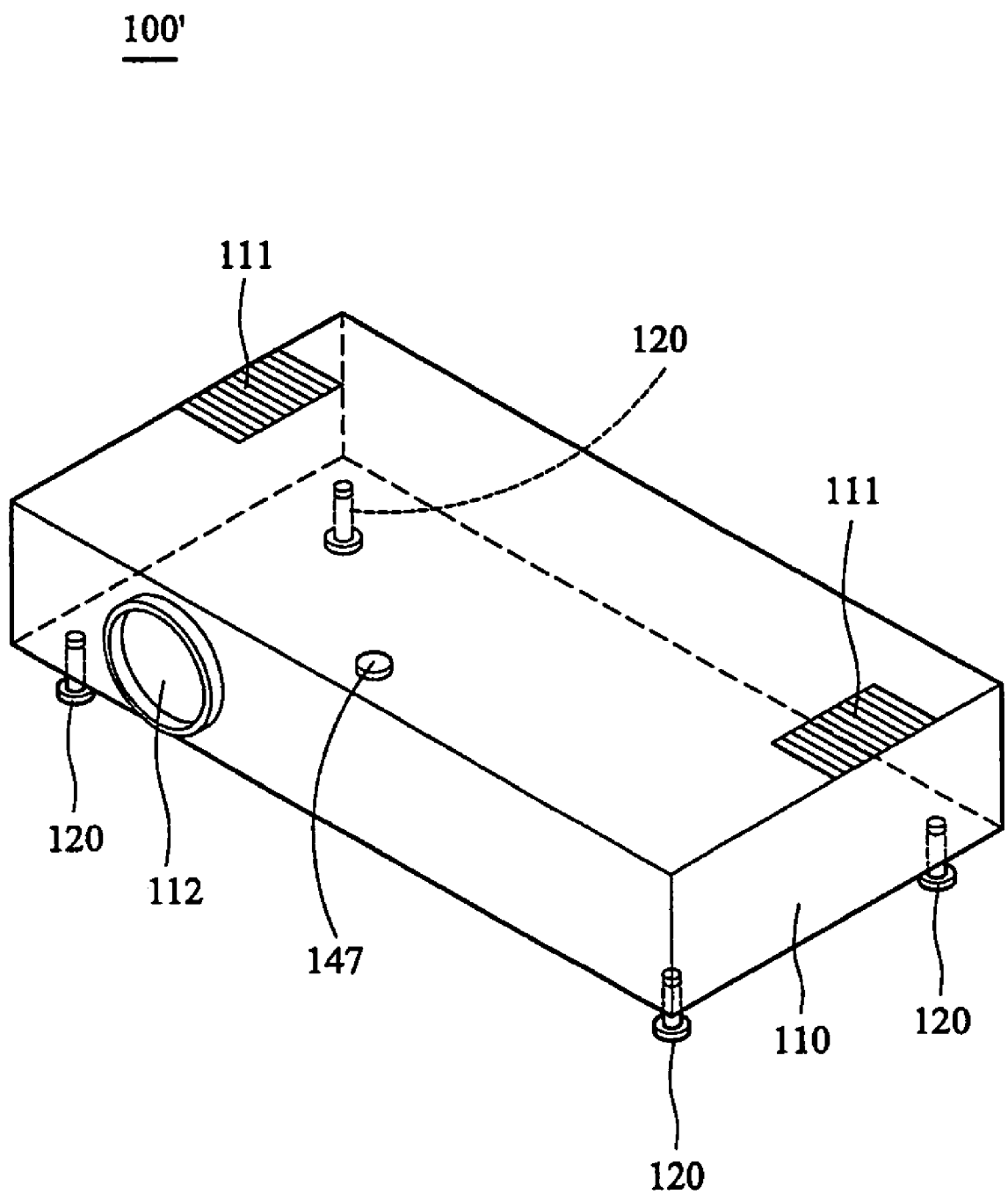
FIG. 6 is a schematic view of another embodiment of an electronic device.
Figure 7:
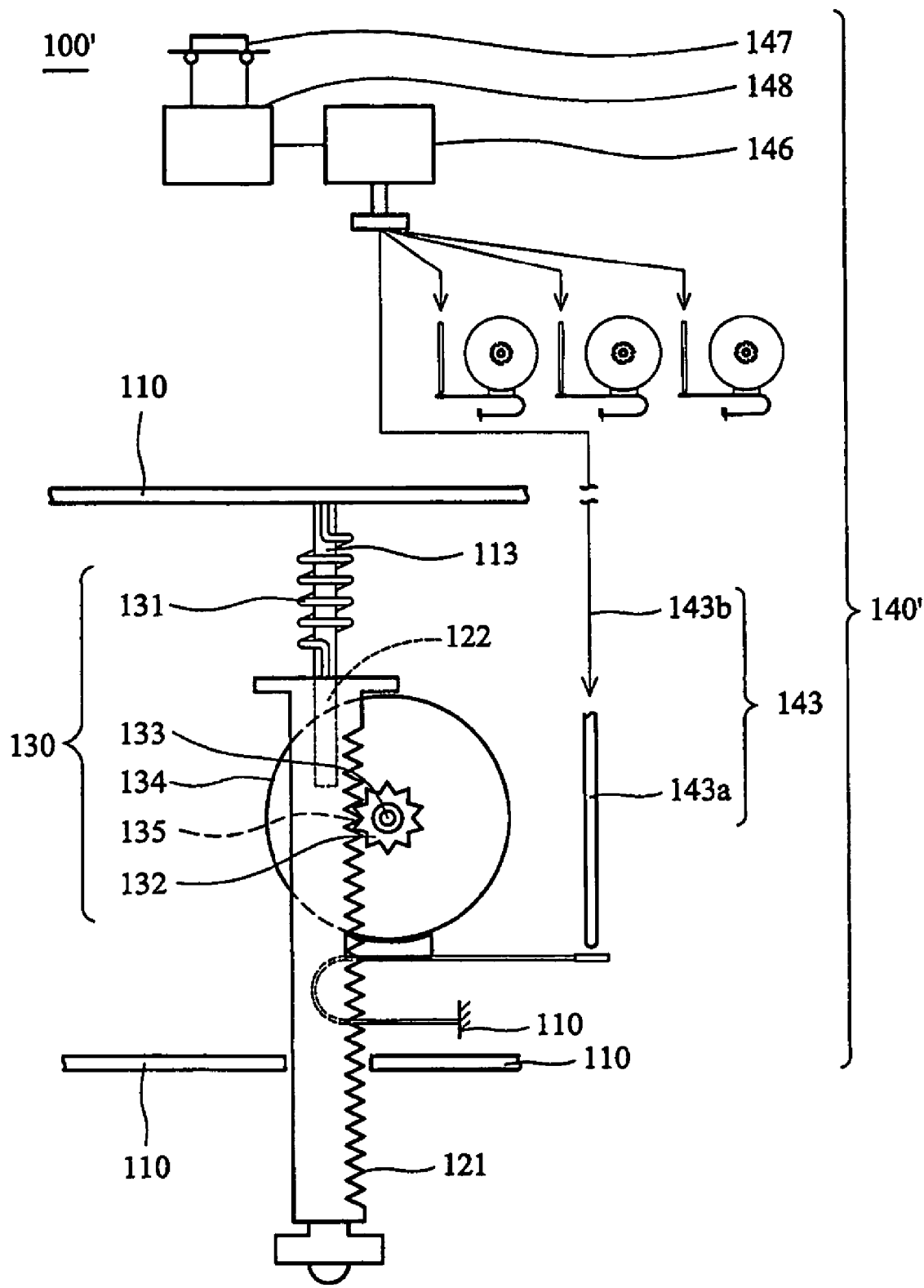
FIG. 7 is a schematic view of an adjustment mechanism in FIG. 6.

FIGS. 6 and 7 depict another embodiment of an electronic device 100' comprising a housing 110, four adjusting members 120, four lifting assemblies 130, and a driving assembly 140'. While the housing 110, the adjusting members 120, and the lifting assemblies 130 in FIG. 7 are the same as those in FIG. 4, they are labeled by the same references and their description is omitted.

The difference between the electronic device 100' in FIG. 6 and the electronic device 100 in FIG. 3 is that one driving assembly 140' controls four lifting assemblies 130 in the electronic device 100' in FIG. 6. Specifically, the driving assembly 140' comprises four second elastic members 141, four brake plates 142, four transmission units 143, a solenoid 146, a switch 147, and a delay circuit 148. While the second elastic members 141, the brake plates 142, and the transmission units 143 in FIG. 7 are the same as those in FIG. 4, they are labeled by the same references and their description is omitted.

The solenoid 146 is connected to the rods 143b of the transmission units 143 so that the release member 143a of the transmission unit 143 is connected to the second elastic member 141. The switch 147 is disposed on the housing 110, and is electrically connected to the solenoid 146 to actuate the solenoid 146. The delay circuit 148 is electrically connected to the switch 147 and the solenoid 146 so that the release member 143a of the transmission unit 143 abuts the second elastic member 141 within a predetermined time after the solenoid 146 is actuated by the switch 147.

To adjust the body of the electronic device 100', the switch 147 is pressed by a single hand solely and no need to hold the button down so that the delay circuit 148 provides the predetermined time for adjustment. The operator could free his finger from the button and focus on accurate adjustment quickly and effortlessly.

Specifically, after the switch 147 is pressed, the release member 143a is moved. Thus, the intermediate wheel 134 and the gear 132 are released, and the adjusting members 120 are ejected outward. During the predetermined time, the position of the body may be adjusted to a required position by a single hand depressing the housing 110. After the predetermined time elapses, the position of the body is fixed.

Note that the delay circuit 148 may be omitted based on requirements. When the delay circuit 148 is omitted, the switch 147 may be a tactile switch. Thus, when the tactile switch 147 is touched, the solenoid 146 is always turned on to be conveniently adjusted. Furthermore, even if the delay circuit 148 is provided in the electronic device 100', the switch 147 may be a tactile switch.

Since the adjustment of the body of the electronic device 100' is controlled by a single switch, it may be performed by a single hand, thus enhancing the convenience.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
    a housing;
    an adjusting member, moveably connected to the object, comprising a plurality of teeth;
    a first elastic member abutting the adjusting member and the housing respectively to move the adjusting member with respect to the housing;
    a gear meshing with the teeth of the adjusting member to position the adjusting member;
    a second elastic member connected to the housing and separably connected to the gear to position the gear; and
    a transmission unit separably connected to the second elastic member to separate the second elastic member from the gear, wherein the adjusting member is moved with respect to the housing by the first elastic member when the second elastic member is separated from the gear by the transmission unit, whereby the position of the housing is adjusted.

2. The electronic device as claimed in claim 1, further comprising a shaft, connected to the housing, on which the gear is disposed.

3. The electronic device as claimed in claim 2, further comprising an intermediate wheel disposed on the shaft to connect to the second elastic member.

4. The electronic device as claimed in claim 2, further comprising a damper disposed on the shaft to restrain the speed of the adjusting member.

5. The electronic device as claimed in claim 1, further comprising a brake plate disposed on the second elastic member so that the second elastic member is connected to the gear via the brake plate.

6. The electronic device as claimed in claim 1, wherein the transmission unit comprises:
    a release member separably abutting the elastic member to separate the second elastic member from the gear; and
    a rod connected to the release member.

7. The electronic device as claimed in claim 1, further comprising a button disposed on the housing and connected to the transmission unit so that the transmission unit is connected to the second elastic member.

8. The electronic device as claimed in claim 1, further comprising:
    a solenoid connected to the transmission unit so that the transmission unit is connected to the second elastic member; and
    a switch disposed on the housing and electrically connected to the solenoid to actuate the solenoid.

9. The electronic device as claimed in claim 8, further comprising a delay circuit electrically connected to the switch and the solenoid so that the transmission unit is connected to the second elastic member within a predetermined time after the solenoid is actuated by the switch.

10. The electronic device as claimed in claim 1, wherein the electronic device is a projector.

* * * * *